United States Patent
Kobayashi et al.

(10) Patent No.: US 8,935,064 B2
(45) Date of Patent: Jan. 13, 2015

(54) CONTROL DEVICE OF VEHICULAR AUTOMATIC TRANSMISSION AND METHOD OF CONTROLLING THE SAME

(75) Inventors: Nobufusa Kobayashi, Anjo (JP); Yoshio Hasegawa, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 659 days.

(21) Appl. No.: 12/696,658

(22) Filed: Jan. 29, 2010

(65) Prior Publication Data

US 2010/0211275 A1     Aug. 19, 2010

(30) Foreign Application Priority Data

Feb. 13, 2009  (JP) ................................ 2009-032054

(51) Int. Cl.
| | |
|---|---|
| G06F 19/00 | (2011.01) |
| F16H 61/04 | (2006.01) |
| F16H 61/16 | (2006.01) |
| F16H 59/68 | (2006.01) |

(52) U.S. Cl.
CPC ............ *F16H 61/0437* (2013.01); *F16H 61/16* (2013.01); *F16H 2059/6807* (2013.01); *F16H 2061/0444* (2013.01); *F16H 2306/14* (2013.01)
USPC .............. 701/55; 477/107; 477/128

(58) Field of Classification Search
CPC .................................................. F16H 2306/14
USPC ............ 701/51, 55, 90; 477/3, 125, 127, 128, 477/130, 133, 136, 143, 144, 906, 907; 475/5, 116, 118–123; 301/51, 55, 90
See application file for complete search history.

(56) References Cited

U.S. PATENT DOCUMENTS

| | | | | |
|---|---|---|---|---|
| 5,454,763 A | * | 10/1995 | Ikebuchi et al. | ............... 475/128 |
| RE37,513 E | * | 1/2002 | Tabata et al. | .................... 477/96 |
| 2005/0267665 A1 | * | 12/2005 | Iwatsuki et al. | ................ 701/70 |

FOREIGN PATENT DOCUMENTS

| | | |
|---|---|---|
| JP | 3-41254 | 2/1991 |
| JP | 10-281277 | 10/1998 |
| JP | 11-63197 | 3/1999 |
| JP | 2001-27312 | 1/2001 |
| JP | 3301344 | 4/2002 |
| JP | 2007-170638 | 7/2007 |

OTHER PUBLICATIONS

Office Action issued Dec. 21, 2010, in Japan Office Action No. 2009-032054 (with English translation).

* cited by examiner

*Primary Examiner* — John Q Nguyen
*Assistant Examiner* — Rodney P King
(74) *Attorney, Agent, or Firm* — Oblon, Spivak, McClelland, Maier & Neustadt, L.L.P.

(57) ABSTRACT

A control device of a vehicular automatic transmission determines, during shifting to a first target gear position, whether the transmission should be shifted to a second target gear position that is remote from the current gear position than the first target gear position, and determines whether a gearshift to the first target gear position was executed during shifting to a third target gear position. If it is determined that the transmission should be shifted to the second target gear position during a multiple gearshift to the first target gear position which is started during shifting to the third target gear position, a multiple gearshift to the second target gear position is inhibited. If it is determined that the transmission should be shifted to the second target gear position during a single gearshift to the first target gear position, the multiple gearshift to the second target gear position is permitted.

21 Claims, 11 Drawing Sheets

FIG.2

|      | C1 | C2 | C3 | C4 | B1 | B2  | F1 |
|------|----|----|----|----|----|-----|----|
| P    |    |    |    |    |    |     |    |
| Rev1 |    |    | O  |    |    | O   |    |
| Rev1 |    |    |    | O  |    | O   |    |
| N    |    |    |    |    |    |     |    |
| 1st  | O  |    |    |    |    | (O) | O  |
| 2nd  | O  |    |    |    | O  |     |    |
| 3rd  | O  |    | O  |    |    |     |    |
| 4th  | O  |    |    | O  |    |     |    |
| 5th  | O  | O  |    |    |    |     |    |
| 6th  |    | O  |    | O  |    |     |    |
| 7th  |    | O  | O  |    |    |     |    |
| 8th  |    | O  |    |    | O  |     |    |

O : ENGAGED

CONTROL DEVICE OF VEHICULAR AUTOMATIC TRANSMISSION AND METHOD OF CONTROLLING THE SAME

INCORPORATION BY REFERENCE

The disclosure of Japanese Patent Application No. 2009-032054 filed on Feb. 13, 2009 including the specification, drawings and abstract is incorporated herein by reference in its entirety.

BACKGROUND OF THE INVENTION

1. Field of the Invention

The invention relates to a control device of an automatic transmission of a vehicle, and in particular to multiple shift control of the automatic transmission.

2. Description of the Related Art

In recent years, there is a trend toward more and more gear positions or speed ratios that can be established by a vehicular automatic transmission, and the intervals between adjacent upshift lines and downshift lines in a shift diagram used for determining a gear position to be established tend to be reduced with the increase in the number of gear position of the automatic transmission. Accordingly, the automatic transmission is more likely to be shifted up or down, as compared with conventional automatic transmissions, and a further shift determination (i.e., a determination that the automatic transmission should be shifted to a further higher or lower gear position) may be made during shifting of the automatic transmission. The term "multiple gearshift" is defined as a type of gearshift that is carried out when a further shift determination as described above is made during shifting of the automatic transmission.

In the multiple gearshift as described above, shift control is more complicated than that for a single gearshift, and therefore, shift shock is more likely to occur. In view of this situation, techniques for reducing shift shock during multiple shifting are disclosed in Japanese Patent Application Publication No. 2007-170638 (JP-A-2007-170638), Japanese Patent Application Publication No. 2001-27312 (JP-A-2001-27312), Japanese Patent Application Publication No. 11-63197 (JP-A-11-63197), and Japanese Patent Application Publication No. 10-281277 (JP-A-10-281277). For example, a control device of an automatic transmission as described in JP-A-2007-170638 inhibits switching of oil-pressure command values generated to friction devices of the automatic transmission so as to reduce shift shock, when a request for a further downshift (i.e., request for a multiple gearshift) is made due to an increase in the amount of depression of the accelerator pedal during a downshift.

In the meantime, when it is determined that an automatic transmission capable of establishing eight gear positions or eight speed ratios should be shifted down to the sixth gear position during downshifting from the eighth gear position to the seventh gear position, a multiple gearshift to the sixth gear position is started. In some cases, it is determined, depending on the amount of operation (or depression) of the accelerator pedal or the rate of change of the operation amount, for example, that the automatic transmission should be shifted from the eighth gear position directly to the sixth gear position without being shifted to the seventh gear position. Thus, when the automatic transmission is shifted from the eighth gear position to the sixth gear position, different shift controls are performed with respect to a multiple gearshift from the eighth gear position to the sixth gear position via the seventh gear position, and a single gearshift from the eighth gear position directly to the sixth gear position.

If it is determined that the automatic transmission should be shifted further down to the fifth gear position during shifting to the sixth gear position, it is difficult to start multiple shift control for an immediate gearshift to the fifth gear position, and multiple shift control for shifting to the fifth gear position is started when the automatic transmission is placed in a certain condition where the gearshift to the sixth gear position is substantially completed. At this time, it is desired to quickly shift the automatic transmission to the fifth gear position. However, when the gearshift to the sixth gear position is executed or started during shifting from the eighth gear position to the seventh gear position, in particular, a shift time it takes the transmission to establish the sixth gear position may be shortened due to an influence of the previous gearshift (i.e., gearshift from the eighth gear position to the seventh gear position), as compared with the case where the automatic transmission is shifted from the eighth gear position directly to the sixth gear position. Therefore, upon a multiple gearshift to the fifth gear position, a difference or deviation may arise between a command oil pressure of an engaging device and the actual oil pressure, and shift shock may occur if further shift control is exercised in this condition.

SUMMARY OF THE INVENTION

The invention provides a control device and a control method for a vehicular automatic transmission capable of establishing a plurality of gear positions, which achieve both reduction of shift shock during multiple shifting and reduction of shift time (i.e., a period of time required to establish a target gear position).

A first aspect of the invention is concerned with a control device of an automatic transmission of a vehicle. The control device includes: a shift control unit that determines a gear position to which the automatic transmission is to be shifted, based on predetermined shift conditions, and executes shift control so as to establish the determined gear position; a second target gear determining unit that determines, during shifting to a first target gear position, whether the shift control unit determines that the automatic transmission is to be further shifted to a second target gear position that is remote from a current gear position than the first target gear position; a multiple shift determining unit that determines whether a gearshift to the first target gear position is carried out during shifting to a third target gear position that is different from the first target gear position and the second target gear position; and a multiple shift permitting unit that inhibits a multiple gearshift to the second target gear position when the shift control unit determines, during a multiple gearshift to the first target gear position which is started during a gearshift to the third target gear position, that the automatic transmission is to be shifted to the second target gear position, and permits the multiple gearshift to the second target gear position when the shift control unit determines, during a single gearshift to the first target gear position, that the automatic transmission is to be shifted to the second target gear position.

In the control device according to the first aspect of the invention, the multiple gearshift to the second target gear position is permitted only when it is determined, during a single gearshift from a given gear position to the first target gear position, that the automatic transmission should be shifted to the second target gear position. Thus, the control device can quickly execute the multiple gearshift to the second target gear position while reducing shift shock during the multiple gearshift. When the automatic transmission is shifted from a given gear position directly to the first target gear position (i.e., a single gearshift is effected), and multiple shift control for a multiple gearshift to the second target gear position is immediately executed under certain conditions, the multiple shift control is started in a condition where a command oil pressure (engaging pressure) of an engaging device to be controlled during the multiple shift control and the actual oil pressure are substantially equal to each other, since there is no influence of the previous gearshift. Accordingly, the engaging pressure of the engaging device is controlled with high accuracy during control of the multiple gearshift to the second target gear position, so that shift shock is favorably suppressed or reduced.

In the control device according to the first aspect of the invention, the multiple gearshift to the second target gear position is inhibited when it is determined, during a multiple gearshift to the first target gear position which is started during shifting from a given gear position to the third target gear position, that the automatic transmission should be shifted to the second target gear position. Thus, the control device effectively reduces shift shock. If a multiple gearshift to the second target gear position is immediately carried out in the above-described situation, the multiple shift control is started in a condition where a large difference or deviation appears between the engaging pressure (command pressure) of the engaging device and the actual oil pressure, due to an influence of the previous gearshift (i.e., gearshift from the given gear position to the third gear position). As a result, shift shock may occur. In this case, therefore, the control device according to the first aspect of the invention inhibits immediate execution of the multiple gearshift to the second target gear position, so that shift shock can be effectively suppressed or reduced.

In the control device as described above, when the multiple shift permitting unit permits the multiple gearshift to the second target gear position, the shift control unit may start multiple shift control for the multiple gearshift to the second gear position when a command oil pressure of an engaging device that is engaged so as to establish the first target gear position reaches a predetermined pressure level.

In the control device as described above, when the multiple gearshift to the second target gear position is permitted by the multiple shift permitting unit, the multiple gearshift to the second target gear position is started when the command oil pressure of the engaging device to be engaged so as to establish the first target gear position reaches the predetermined pressure level. Thus, the control device starts the multiple gearshift to the second target gear position immediately after the engaging pressure of the engaging device becomes equal to the predetermined pressure level appropriate to start of the gearshift to the second target gear position. Accordingly, shift shock is effectively suppressed or reduced during multiple shifting to the second target gear position, and the shift time is shortened.

In the control device as described above, when the multiple shift permitting unit inhibits the multiple gearshift to the second target gear position, the shift control unit may start shift control for a gearshift to the second target gear position after the gearshift to the first target gear position is completed.

In the control device as described above, when the multiple gearshift to the second target gear position is inhibited by the multiple shift permitting unit, the gearshift to the second target gear position is executed after the gearshift to the first target gear position is completed. Thus, shift shock can be surely suppressed at the time of the gearshift to the second target gear position.

In the control device as described above, the engaging device may be engaged when the automatic transmission is shifted to the first target gear position, and may be released when the automatic transmission is shifted to the second target gear position.

In the control device as described above, the engaging device is engaged when the automatic transmission is shifted to the first target gear position, while the engaging device is released when the automatic transmission is shifted to the second target gear position. If a multiple gearshift to the first target gear position is executed or started during shifting to the third target gear position, the shift time it takes to establish the first target gear position is shortened due to an influence of the previous gearshift to the third target gear position, and a large difference may arise between the command pressure of the engaging device and the actual oil pressure. In this case, the control device inhibits the multiple gearshift to the second target gear position, so as to reduce or prevent shift shock which would otherwise occur due to multiple shifting to the second target gear position in a condition where the above-mentioned difference appears.

In the control device as described above, the automatic transmission may be shifted down to the first target gear position.

In the control device as described above, the automatic transmission may be shifted down to the first target gear position; therefore, shift shock is effectively reduced at the time of downshifting, and the shift time is shortened.

A second aspect of the invention is concerned with a method of controlling an automatic transmission of a vehicle. The control method includes the steps of: determining a gear position to which the automatic transmission is to be shifted, based on predetermined shift conditions, and executing shift control so as to establish the determined gear position; determining, during shifting to a first target gear position, whether it is determined that the automatic transmission is to be further shifted to a second target gear position that is remote from a current gear position than the first target gear position; determining whether a gearshift to the first target gear position is carried out during shifting to a third target gear position that is different from the first target gear position and the second target gear position; inhibiting a multiple gearshift to the second target gear position when it is determined, during a multiple gearshift to the first target gear position which is started during a gearshift to the third target gear position, that the automatic transmission is to be shifted to the second target gear position; and permitting the multiple gearshift to the second target gear position when it is determined, during a single gearshift to the first target gear position, that the automatic transmission is to be shifted to the second target gear position.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an operation table useful for explaining operations of engaging elements when a plurality of gear positions are established in the automatic transmission of FIG. 1;

DETAILED DESCRIPTION OF EMBODIMENTS

Figure 1:
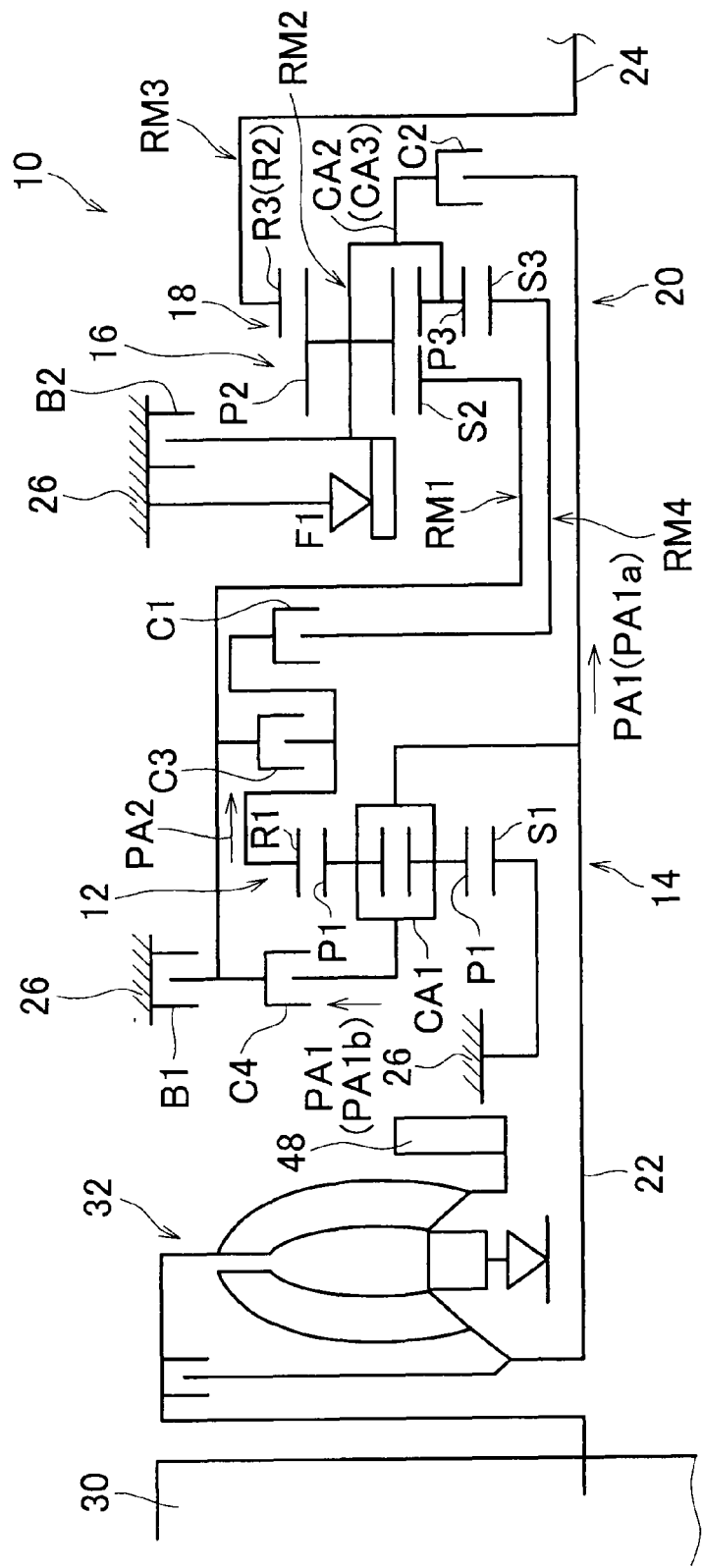
FIG. 1 is a skeleton diagram illustrating the construction of a vehicular automatic transmission controlled according to one embodiment of the invention.

One embodiment of the invention will be described in detail with reference to the drawings. It is to be understood that the drawings depicting the following embodiment may be simplified or modified as needed, and the dimensional ratios and shapes, for example, of components or portions depicted in the drawings are not necessarily accurate.

In the following description, the term "multiple gearshift" is defined as a gearshift that is carried out when it is determined during shifting to a certain gear position that the automatic transmission should be further shifted to another gear position.

Also, the term "single gearshift" is defined as a direct gearshift to a gear position to which the automatic transmission should be shifted. A gearshift (called "skipping gearshift") in which an intermediate gear position present between the current gear position and a target gear position to be established is skipped is also referred to as "single gearshift".

FIG. 1 is a skeleton diagram illustrating the construction of a vehicular automatic transmission 10 (which will be simply called "automatic transmission 10") that is controlled according to one embodiment of the invention. FIG. 2 is an operation table useful for explaining the operations of engaging elements for establishing a plurality of gear positions or speed ratios in the automatic transmission 10. The automatic transmission 10 has a first speed change portion 14 that consists principally of a double-pinion type first planetary gear set 12, and a second speed change portion 20 that consists principally of a single-pinion type second planetary gear set 16 and a double-pinion type third planetary gear set 18. In a transmission case (which will be simply called "case") 26 as a non-rotary member mounted on the vehicle body, the first speed change portion 14 and the second speed change portion 20 are disposed on a common axis, and are operable to change the speed of rotation of an input shaft 22, to produce an output from an output shaft 24. The input shaft 22, which corresponds to an input rotary member, is a turbine shaft of a torque converter 32 that is driven and rotated by an engine 30 as a source of power for running the vehicle. The output shaft 24, which corresponds to an output rotary member, drives and rotates right and left driving wheels, via a differential gear device (final drive), a pair of axles, and so forth, which are not illustrated. It is to be noted that the automatic transmission 10 is constructed generally symmetrically with respect to its axis, and the lower half of the automatic transmission 10 below the axis is not illustrated in the skeleton diagram of FIG. 1.

The first planetary gear set 12 includes a sun gear S1, a plurality of pairs of pinion gears P1 that mesh with each other, a carrier CA1 that supports the pinion gears P1 such that the pinion gears P1 are rotatable about themselves and about the axis of the gear set 12, and a ring gear R1 that engages with the sun gear S1 via the pinion gears P1. The sun gear S1, carrier CA1 and the ring gear R1 provide three rotary elements of the first planetary gear set 12. The carrier CA1 is coupled to and driven/rotated by the input shaft 22, and the sun gear 51 is fixed to the case 26 so as not to be able to rotate. The ring gear R1 serves as an intermediate output member, and is rotated at a reduced speed with respect to the input shaft 22, for transmission of rotation to the second speed change portion 20. In this embodiment, rotation of the input shaft 22 is transmitted at the same speed to the second speed change portion 20 via a first intermediate output path PAL in other words, rotation of the input shaft 22 is transmitted to the second speed change portion 20 at a predetermined fixed speed ratio (=1.0) via the first intermediate output path PA1. The first intermediate output path PA1 may be a direct transmission path PA1a through which rotation is transmitted from the input shaft 22 to the second speed change portion 20 without passing through the first planetary gear set 12, or an indirect transmission path PA1b through which rotation is transmitted from the input shaft 22 to the second speed change portion 20 via the carrier CA1 of the first planetary gear set 12. Also, rotation of the input shaft 22 is transmitted at a reduced speed to the second speed change portion 20 via a second intermediate output path PA2, more specifically, via the carrier CA1, pinion gears P1 mounted on the carrier CA1 and the ring gear R1. In other words, rotation of the input shaft 22 is transmitted to the second speed change portion 20 at a speed ratio (>1.0) that is larger than that of the first intermediate output path PA1.

The second planetary gear set 16 includes a sun gear S2, pinion gears P2, a carrier CA2 that supports the pinion gear P2 such that the pinion gears P2 are rotatable about themselves and about the axis of the gear set 16, and a ring gear R2 that engages with the sun gear S2 via the pinion gears P2. The third planetary gear set 18 includes a sun gear S3, a plurality of pairs of pinion gears P2 and P3 that mesh with each other, a carrier CA3 that supports the pinion gears P2 and P3 such that the pinion gears P2 and P3 are rotatable about themselves and about the axis of the gear set 18, and a ring gear R3 that engages with the sun gear S3 via the pinion gears P2 and P3.

A part of the second planetary gear set 16 and a part of the third planetary gear set 18 are coupled with each other to provide four rotary elements RM1-RM4. More specifically, the sun gear S2 of the second planetary gear set 16 provides a first rotary element RM1, and the carrier CA2 of the secondary planetary gear set 16 and the carrier CA3 of the third planetary gear set 18 are coupled integrally with each other to provide a second rotary element RM2, while the ring gear R2 of the second planetary gear set 16 and the ring gear R3 of the third planetary gear set 18 are coupled integrally with each other to provide a third rotary element RM3, and the sun gear S3 of the third planetary gear set 18 provides a fourth rotary element RM4. The second planetary gear set 16 and the third planetary gear set 18 constitute a Ravigneaux gear train in which the carriers CA2 and CA3 are formed from a common member, and the ring gears R2 and R3 are formed from a common member, while the pinion gears P2 of the second planetary gear set 16 also serve as the second pinion gears of the third planetary gear set 18. In this connection, the pinion gears P3 are the first pinion gears of the third planetary gear set 18.

The automatic transmission 10 includes a clutch C1, clutch C2, clutch C3, and a clutch C4 (which will be simply called "clutch C" when they are not distinguished from one another), and a brake B1 and a brake B2 (which will be simply called "brake B" when they are not distinguished from each other), as engaging elements that are selectively engaged or disengaged so as to establish a plurality of speed positions having different speed ratios or gear ratios. The first rotary element RM1 (sun gear S2) is selectively coupled to the case 26 via the first brake B1 so as to be inhibited from rotating, and is selectively coupled to the ring gear R1 of the first planetary gear set 12 as the intermediate output member (i.e., to the second intermediate output path PA2), via the third clutch C3. The first rotary element RM1 (sun gear S2) is also selectively coupled to the carrier CA1 of the first planetary gear set 12 (i.e., to the indirect transmission path PA1b as the first intermediate output path PA1) via the fourth clutch C4. The second rotary element RM2 (carriers CA2 and CA3) is selectively coupled to the case 26 via the brake B2 so as to be inhibited from rotating, and is selectively coupled to the input shaft 22 (i.e., to the direct transmission path PA1a as the first intermediate output path PA1) via the second clutch C2. The third rotary element RM3 (ring gears R2 and R3) is coupled integrally with the output shaft 24 so as to deliver rotation (power) to the output shaft 24. The fourth rotary element RM4 (sun gear S3) is selectively coupled to the ring gear R1 via the first clutch C1. A one-way clutch F1 is disposed in parallel with the second brake B2, between the second rotary element RM2 and the case 26. The one-way clutch F1 permits the second rotary element RM2 to rotate in the positive direction (in the same direction as that of the input shaft 22) and inhibits the second rotary element RM2 from rotating in the reverse direction.

The operation table of FIG. 2 is provided for explaining the operating states of the clutches C1-C4 and the brakes B1, B2 when each of the gear positions is established in the automatic transmission 10. In FIG. 2, "O" represents an engaged state, and "(O)" represents an engaged state only when an engine brake is applied, while a blank space represents a release state. Since the one-way clutch F1 is provided in parallel with the second brake B2 for establishing the first gear position "1st", there is no need to engage the second brake B2 when the vehicle is started or accelerated. The speed ratios of the respective gear positions are determined as appropriate by the respective gear ratios ρ1, ρ2, ρ3 of the first planetary gear set 12, second planetary gear set 16 and the third planetary gear set 18.

Figure 3:
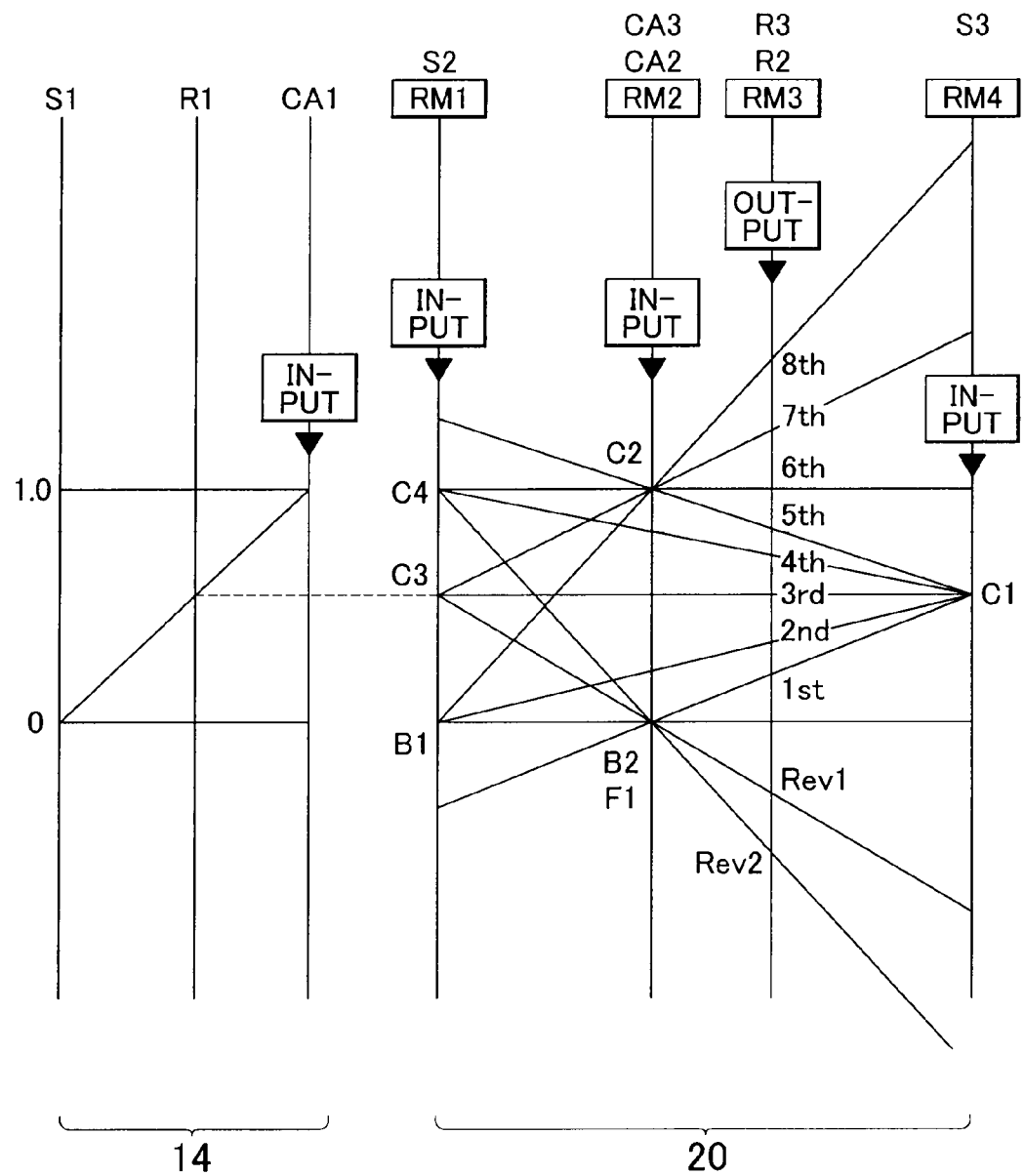
FIG. 3 is an alignment chart indicating the rotational speeds of respective rotary elements of the automatic transmission of FIG. 1, using straight lines.

FIG. 3 is an alignment chart that indicates the rotational speeds of the respective rotary elements of the first speed change portion 14 and second speed change portion 20, using straight lines. In FIG. 3, the lower horizontal lines indicate a rotational speed "0", and the upper horizontal lines indicate a rotational speed "1.0", i.e., the same rotational speed as that of the input shaft 22. Three vertical lines of the first speed change portion 14 represent the sun gear S1, ring gear R1 and the carrier CA1, respectively, as viewed from the left-hand side, and the intervals of these vertical lines are determined according to the gear ratio ρ1 (the number of teeth of the sun gear S1/the number of teeth of the ring gear R1) of the first planetary gear unit 12. Four vertical lines of the second speed change portion 20 represent the first rotary element RM1 (sun gear S2), second rotary element RM2 (carrier CA2 and carrier CA3), third rotary element RM3 (ring gear R2 and ring gear R3) and the fourth rotary element RM4 (sun gear S3), respectively, as viewed from the left-hand side toward the right end, and the intervals of these vertical lines are determined according to the gear ratio ρ2 of the second planetary gear set 16 and the gear ratio ρ3 of the third planetary gear set 18.

As shown in FIG. 2 and FIG. 3 as described above, when the first clutch C1 and the second brake B2 are engaged, so that the fourth rotary element RM4 is rotated at a reduced speed relative to the input shaft 22 via the first speed change portion 14, and the second rotary element RM2 is inhibited from rotating, the third rotary element RM3 coupled to the output shaft 24 is rotated at a rotational speed denoted as "1st speed", and the first gear position "1st" having the largest speed ratio (=rotational speed of the input shaft 22/rotational speed of the output shaft 24) is established.

When the first clutch C1 and the first brake B1 are engaged, so that the fourth rotational element RM4 is rotated at a reduced speed relative to the input shaft 22 via the first speed change portion 14, and the first rotary element RM1 is inhibited from rotating, the third rotary element RM3 is rotated at a rotational speed denoted as "2nd speed", and the second gear position "2nd" having a smaller speed ratio than that of the first gear position "1st" is established.

When the first clutch C1 and the third clutch C3 are engaged, and the fourth rotary element RM4 and the first rotary element RM1 are rotated at a reduced speed relative to the input shaft 22 via the first speed change portion 14 so that the second speed change portion 20 is rotated as a unit, the third rotary element RM3 is rotated at a rotational speed denoted as "3rd speed", and the third gear position "3rd" having a smaller speed ratio than that of the second gear position "2nd" is established.

When the first clutch C1 and the fourth clutch C4 are engaged, so that the fourth rotary element RM4 is rotated at a reduced speed relative to the input shaft 22 via the first speed change portion 14, and the first rotary element RM1 is rotated as a unit with the input shaft 22, the third rotary element RM3 is rotated at a rotational speed denoted as "4th speed", and the fourth gear position "4th" having a smaller speed ratio than that of the third gear position "3rd" is established.

When the first clutch C1 and the second clutch C2 are engaged, so that the fourth rotary element RM4 is rotated at a reduced speed relative to the input shaft 22 via the first speed change portion 14, and the second rotary element RM2 is rotated as a unit with the input shaft 22, the third rotary element RM3 is rotated at a rotational speed denoted as "5th speed", and the fifth gear position "5th" having a smaller speed ratio than that of the fourth gear position "4th" is established.

When the second clutch C2 and the fourth clutch C4 are engaged so that the second speed change portion 20 is rotated as a unit with the input shaft 22, the third rotary element RM3 is rotated at a rotational speed denoted as "6th speed", i.e., at the same rotational speed as that of the input shaft 22, and the sixth gear position "6th" having a smaller speed ratio than that of the fifth gear position "5th" is established. The speed ratio of the sixth gear position "6th" is equal to 1.

When the second clutch C2 and the third clutch C3 are engaged, so that the first rotary element RM1 is rotated at a reduced speed relative to the input shaft 22 via the first speed change portion 14, and the second rotary element RM2 is rotated as a unit with the input shaft 22, the third rotary element RM3 is rotated at a rotational speed denoted as "7th speed", and the seventh gear position "7th" having a smaller speed ratio than that of the sixth gear position "6th" is established.

When the second clutch C2 and the first clutch B1 are engaged, so that the second rotary element RM2 is rotated as a unit with the input shaft 22, and the first rotary element RM1 is inhibited from rotating, the third rotary element RM3 is rotated at a rotational speed denoted as "8th speed", and the eighth gear position "8th" having a smaller speed ratio than that of the seventh gear position "7th" is established.

When the third clutch C3 and the second brake B2 are engaged, the first rotary element RM1 is rotated at a reduced speed via the first speed change portion 14, and the second rotary element RM2 is inhibited from rotating. As a result, the third rotary element RM3 is rotated in the reverse direction at a rotational speed denoted as "Rev1 speed", and the first reverse-drive gear position "Rev1" having the largest speed ratio is established. When the fourth clutch C4 and the second brake B2 are engaged, the first rotary element RM1 is rotated as a unit with the input shaft 22, and the second rotary element RM2 is inhibited from rotating. As a result, the third rotary element RM3 is rotated in the reverse direction at a rotational speed denoted as "Rev2 speed", and the second reverse-driver gear position "Rev2" having a smaller speed ratio than that of the first reverse-drive gear position "Rev1" is established. In the first reverse-drive gear position "Rev1" and the second reverse-drive gear position "Rev2", the output shaft 24 is rotated in the direction opposite to that of the input shaft 22, at the speed ratios corresponding to those of the first gear position and the second gear position, respectively.

Thus, the automatic transmission 10 of this embodiment is placed in a selected one of a plurality of gear positions having different speed ratios, with the engagement of selected ones of a plurality of engaging elements, i.e., the clutches C1-C4 and the brakes B1, B2. In the automatic transmission 10, the first speed change portion 14 having two intermediate output paths PA1, PA2 that provide different speed ratios and the second speed change portion 20 having the two planetary gear sets 16, 18 cooperate with each other to establish eight-speed forward-drive gear positions, with the engagement and disengagement of selected ones of the four clutches C1-C4 and two brakes B1, B2. Thus, the automatic transmission 10 is constructed in small size, and is installed on the vehicle with improved ease or efficiency. The clutches C1-C4 and the brakes B1, B2 are hydraulic friction devices, such as multiple-plate clutches or multiple-disc type brakes, which are engaged or disengaged under control by hydraulic actuators.

Figure 4:
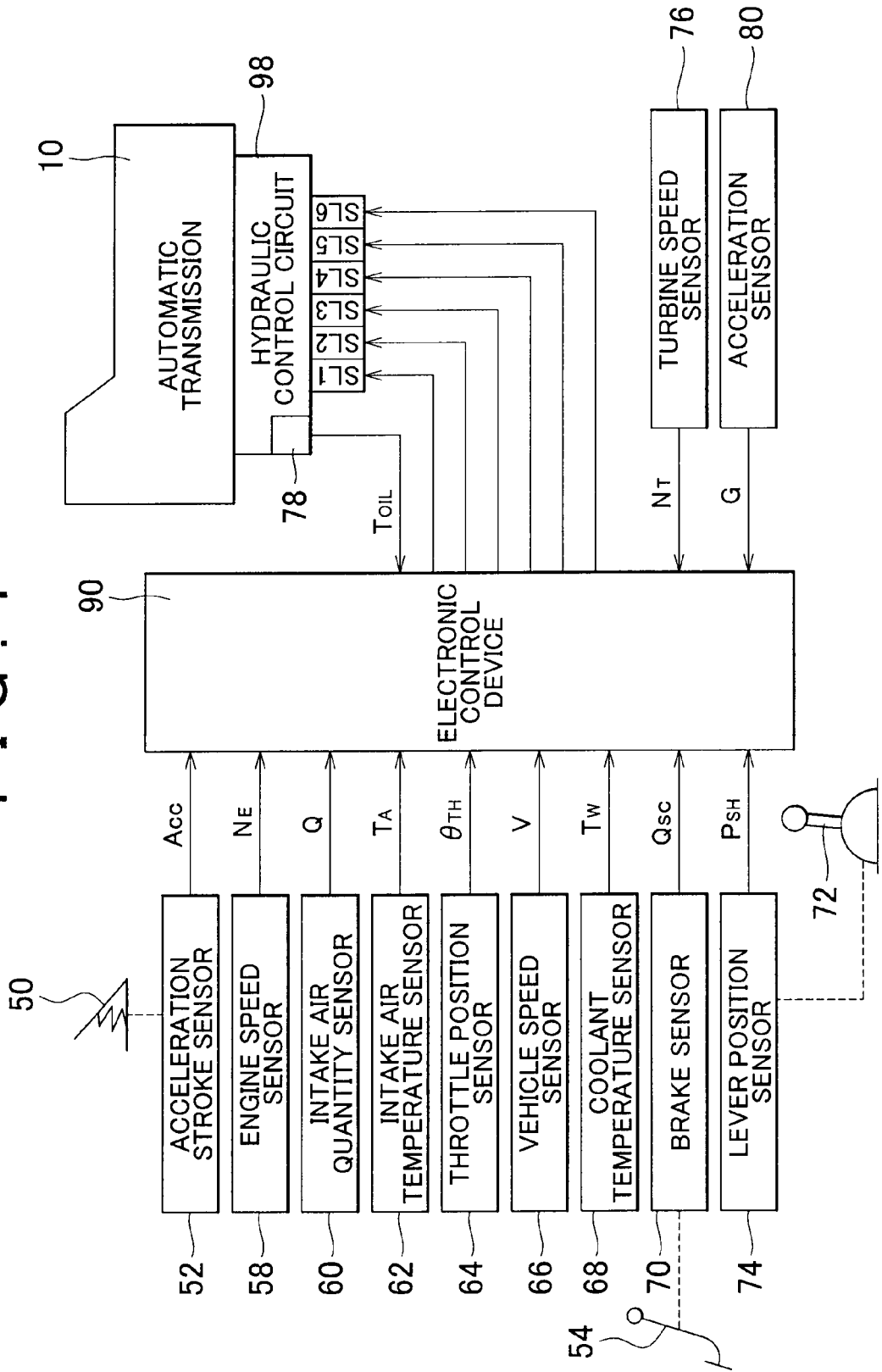
FIG. 4 is a block diagram illustrating a principal part of a control system provided in the vehicle for controlling the automatic transmission of FIG. 1 and so forth.

FIG. 4 is a block diagram illustrating a principal part of a control system provided in the vehicle for controlling the automatic transmission 10 of FIG. 1, for example. An electronic control device 90 shown in FIG. 4 includes a so-called microcomputer having CPU, RAM, ROM, input/output interface, etc., and performs signal processing according to programs stored in advance in the ROM, utilizing the temporary storage function of the RAM, so as to implement output control of the engine 30, shift control of the automatic transmission 10, and so forth. The electronic control device 90 may be divided as needed into a unit for engine control, a unit for shift control, and so forth.

In FIG. 4, an acceleration stroke sensor 52 detects the amount of operation Acc of an accelerator pedal 50, and supplies a signal indicative of the accelerator pedal operation amount Acc to the electronic control device 90. The accelerator pedal 50, as one example of accelerator operating member, is depressed by a degree commensurate with or proportional to the power output requested by the driver; therefore, the accelerator pedal operation amount Acc is equivalent to the required (i.e., driver-requested) power output. Also, a signal indicative of the amount of depression $\theta_{SC}$ of a brake pedal 54 of a foot brake system as a service brake is supplied to the electronic control device 90. The brake pedal 54, as one example of brake operating member, is depressed by a degree commensurate with or proportional to the deceleration requested by the driver; therefore, the amount of depression $\theta_{SC}$, or the brake operation amount, is equivalent to the required (i.e., driver-requested) deceleration.

The control system as shown in FIG. 4 includes an engine speed sensor 58 for detecting the rotational speed $N_E$ of the engine 30, an intake air quantity sensor 60 for detecting the intake air quantity Q of the engine 30, an intake air temperature sensor 62 for detecting the temperature $T_A$ of the intake air, a throttle position sensor 64 equipped with an idle switch, for detecting the fully closed state (or idling state) of an electronic throttle valve of the engine 30 and the throttle opening $\theta_{TH}$, a vehicle speed sensor 66 for detecting the vehicle speed V (corresponding to the rotational speed $N_{OUT}$ of the output shaft 24), a coolant temperature sensor 68 for detecting the coolant temperature $T_W$ of the engine 30, a brake sensor 70 for determining whether the brake pedal 54 is operated and detecting the amount of depression $\theta_{SC}$ of the brake pedal 54, a lever position sensor 74 for detecting the lever position $P_{SH}$, to which the shift lever 72 is operated, a turbine speed sensor 76 for detecting the turbine speed $N_T$ (=the rotational speed $N_{IN}$ of the input shaft 22), an AT oil temperature sensor 78 for detecting the AT oil temperature $T_{OIL}$ as the temperature of hydraulic oil in a hydraulic control circuit 98, an acceleration sensor 80 for detecting the acceleration G or deceleration G of the vehicle, and so forth. The electronic control device 90 receives signals indicative of the engine speed $N_E$, the intake air quantity Q, the intake air temperature $T_A$, the throttle opening $\theta_{TH}$, the vehicle speed V, the engine coolant temperature $T_W$, the presence or absence of an operation of the brake pedal and the amount of depression thereof $\theta_{SC}$, the lever position $P_{SH}$ of the shift lever 72, the turbine speed $N_T$, the AT oil temperature $T_{OIL}$, the acceleration G or deceleration G of the vehicle, etc. from the above-indicated sensors and switches.

Figure 5:
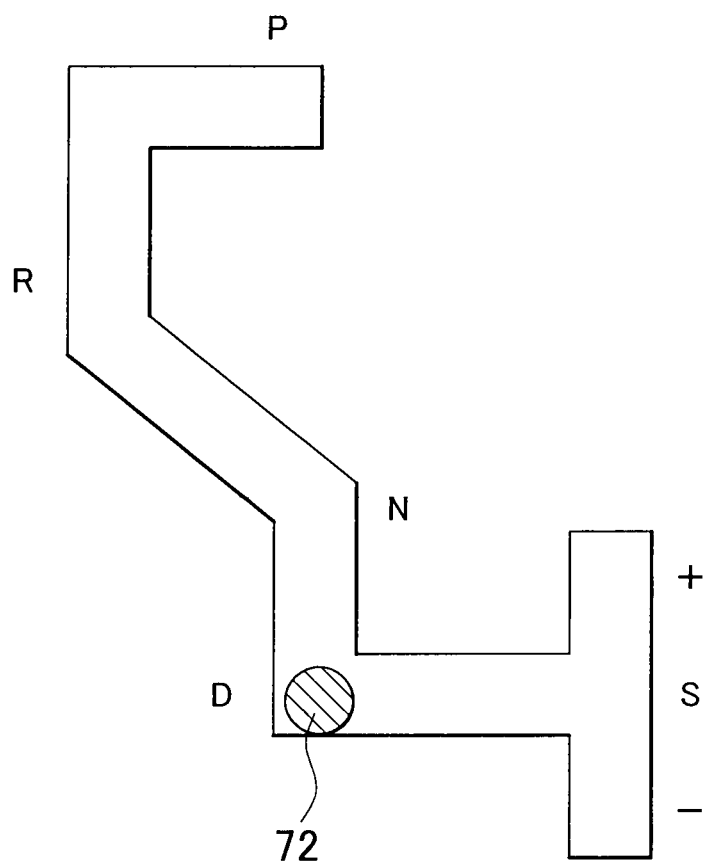
FIG. 5 is a view showing one example of a shifting device including a shift lever, which is operated so as to select one from a plurality of shift positions.

The shift lever 72 is mounted in the vicinity of the driver's seat, for example, and is arranged to be manually operated to a selected one of five lever positions "P", "R", "N", "D" and "S", as shown in FIG. 5. The "P" position is a parking position for disconnecting (or releasing) a power transmission path in the automatic transmission 10, and mechanically inhibiting (locking) rotation of the output shaft 24 by means of a mechanical parking mechanism. The "R" position is a reverse-drive running position for rotating the output shaft 24 of the automatic transmission 10 in the reverse direction, and the "N" position is a position for interrupting or cutting off power transmission by disconnecting the power transmission path in the automatic transmission 10. The "D" position is a forward-drive running position in which automatic shift control is carried out within a shift range (i.e., D range) in which the automatic transmission 10 is allowed to be shifted over a range from the 1st speed to the 8th speed. The "S" position is a forward-drive running position in which the automatic transmission 10 can be manually shifted by allowing the driver to select one of a plurality of shift ranges having different high-speed gear positions to which the automatic transmission 10 can be shifted, or select one of a plurality of gear positions. The "S" position is provided with a "+" position for shifting the shift range or gear position to the UP side each time the shift lever 72 is operated to the "+" position, and a "−" position for shifting the shift range or gear position to the DOWN side each time the shift lever 72 is operated to the "−" position. The above-indicated lever position sensor 74 detects the lever position $P_{SH}$ in which the shift lever 72 is placed.

The hydraulic control circuit 98 includes a manual valve coupled to the shift lever 72 via a cable or a link, for example, and the manual valve is mechanically operated in accordance with the operation of the shift lever 72, so as to switch oil paths in the hydraulic control circuit 98. For example, when the shift lever 72 is operated to the "D" position or "S" position, a forward-drive oil pressure PD is generated so as to mechanically establish a forward-drive circuit, so that the vehicle is able to run forward during shifting to a forward-drive gear position selected from the first gear position "1st" through the eighth gear position "8th". When the shift lever 72 is operated to the "D" position, the electronic control device 90 determines the operation of the shift lever 72 based on a signal of the lever position sensor 74, and establishes an automatic shift mode in which shift control is performed using all of the forward-drive gear positions, i.e., the first gear position "1st" through the eighth gear position "8th".

Figure 6:
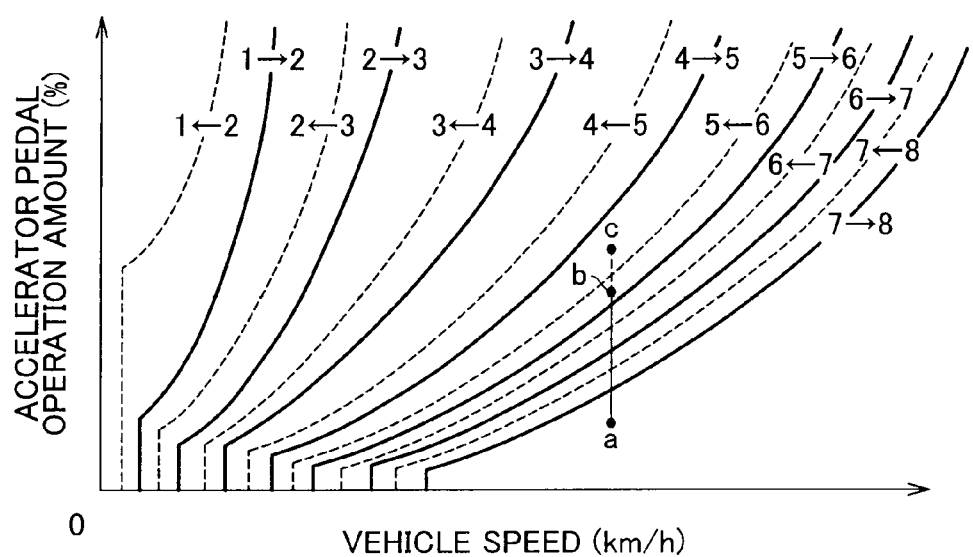
FIG. 6 is a shift diagram used for determining a gear position to which the automatic transmission should be shifted, based on the actual vehicle speed and accelerator pedal operation amount, from pre-stored relationships using the vehicle speed and the accelerator pedal operation amount as parameters.

The electronic control device 90 includes a shift control unit 100 (see FIG. 8) as one of its functions. The shift control unit 100 makes a shift determination (i.e., determines a gear position to be established), based on the actual vehicle speed V and accelerator pedal operation amount Acc, referring to a pre-stored map or shift diagram as shown in FIG. 6, for example, using the vehicle speed V and the accelerator pedal operation amount Acc as parameters, and performs shift control so as to establish the thus determined gear position. For example, as the vehicle speed V decreases or the accelerator pedal operation amount Acc increases, a gear position having a larger speed ratio and suitably selected for lower vehicle speeds is established. In the shift control, linear solenoid valves SL1-SL6 provided in the hydraulic control circuit 98 for shifting are energized, or deenergized, or subjected to current control, so that one or more of the clutches C and brakes B is/are engaged or released so as to establish the gear position determined, while transient oil pressures in the process of shifting are controlled. Namely, the energization or deenergization of each of the linear solenoid valves SL1-SL6 is controlled, so that one or more of the clutches C and brakes B is/are engaged or released so as to establish a forward-drive gear position selected from the first gear position "1st" through the eighth gear position "8th". It is to be understood that shift control may be performed in various forms, based on, for example, the throttle opening $\theta_{TH}$, intake air quantity Q and/or the slope of the road on which the vehicle is running.

In the shift diagram of FIG. 6, the solid lines indicate shift lines (upshift lines) based on which an upshift is determined, and the broken lines indicate shift lines (downshift lines) based on which a downshift is determined. In the case where the actual accelerator pedal operation amount Acc (%) is a given value, the shift lines in the shift diagram of FIG. 6 are used for determining whether the actual vehicle speed V on a horizontal line indicating the given value Acc (%) has crossed any of the shift lines, namely, whether the actual vehicle speed V becomes higher or lower than a value $V_S$ at a shift point on the shift line where shifting should be carried out. In the shift diagram of FIG. 6, values $V_S$, or shift-point vehicle speeds, corresponding to respective values of the varying actual accelerator pedal operation amount Acc (%), are set on each of the shift lines, and each shift line of FIG. 6 is stored in advance as a collection of the shift-point vehicle speeds.

Figure 7:
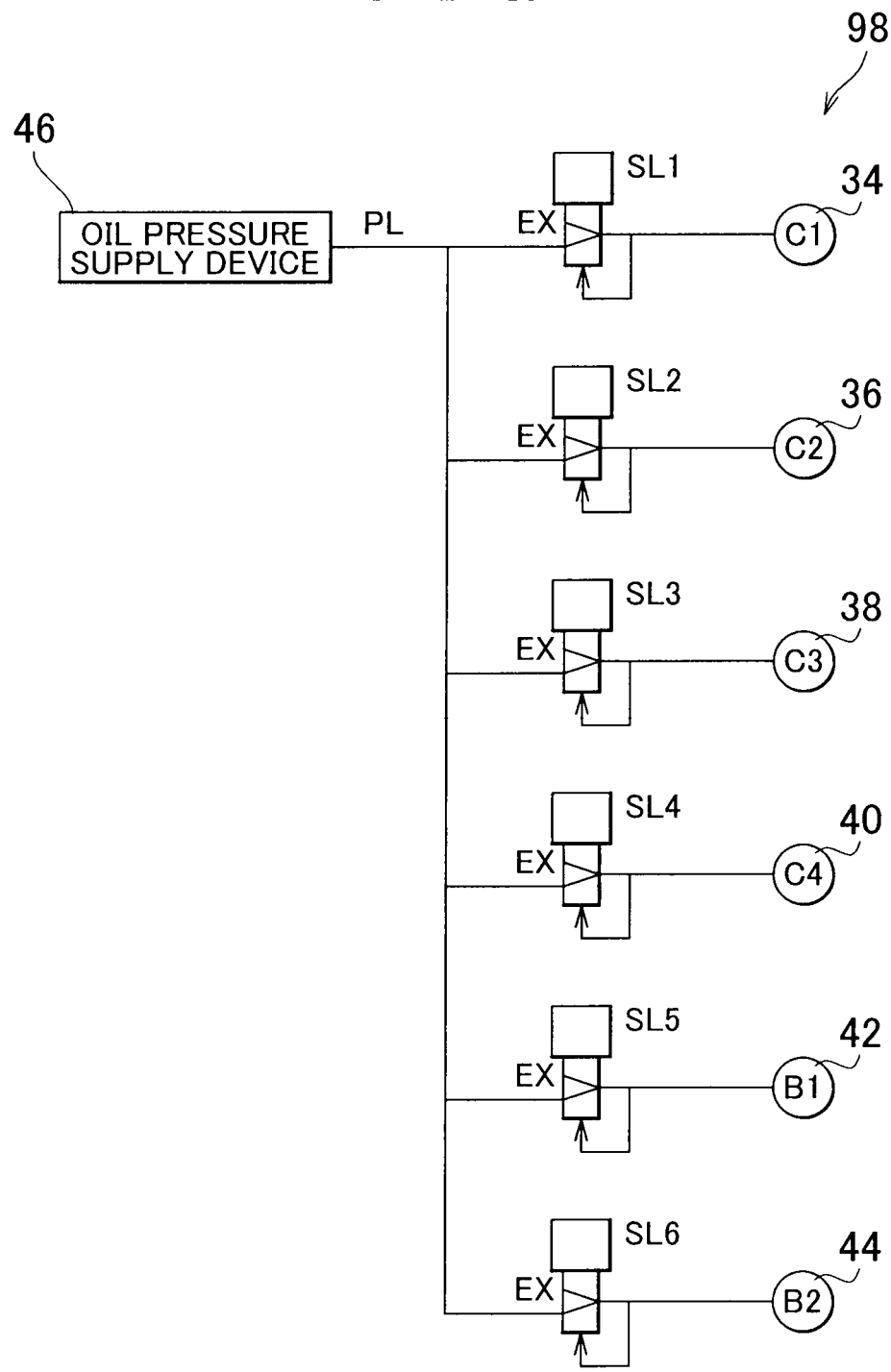
FIG. 7 is a circuit diagram showing a portion of a hydraulic control circuit of FIG. 4, which is associated with linear solenoid valves.

FIG. 7 is a circuit diagram showing a part of the hydraulic control circuit 98 concerning the linear solenoid valves SL1-SL6. In FIG. 7, a line pressure PL generated from an oil pressure supply device 46 is regulated by the respective linear solenoid valves SL1-SL6 and supplied to respective hydraulic actuators (hydraulic cylinders in this embodiment) 34, 36, 38, 40, 42, 44 of the clutches C1-C4 and brakes B1, B2. The oil pressure supply device 46 includes a mechanical oil pump 48 (see FIG. 1) that is driven/rotated by the engine 30, a regulating valve for regulating the line pressure PL, and so forth, and is arranged to control the line pressure PL depending on the engine load, or the like. The linear solenoid valves SL1-SL6, which basically have the same construction, are individually and independently energized or deenergized by the electronic control device 90 (see FIG. 4), so that the oil pressures applied to the respective hydraulic actuators 34, 36, 38, 40, 42, 44 are independently regulated or controlled. In the shift control of the automatic transmission 10, a so-called clutch-to-clutch shift is carried out in which release and engagement of the clutch(es) C and/or brake(es) B involved in the gearshift in question are controlled at the same time. In a downshift from the 5th speed (the fifth gear position) to the 4th speed (the fourth gear position), for example, the clutch C2 is released and the clutch C4 is engaged, as indicated in the operation table of FIG. 2, such that a transient oil pressure in the clutch C2 that is being released and a transient oil pressure in the clutch C4 that is being engaged are appropriately controlled so as to reduce or prevent shift shock.

Figure 8:
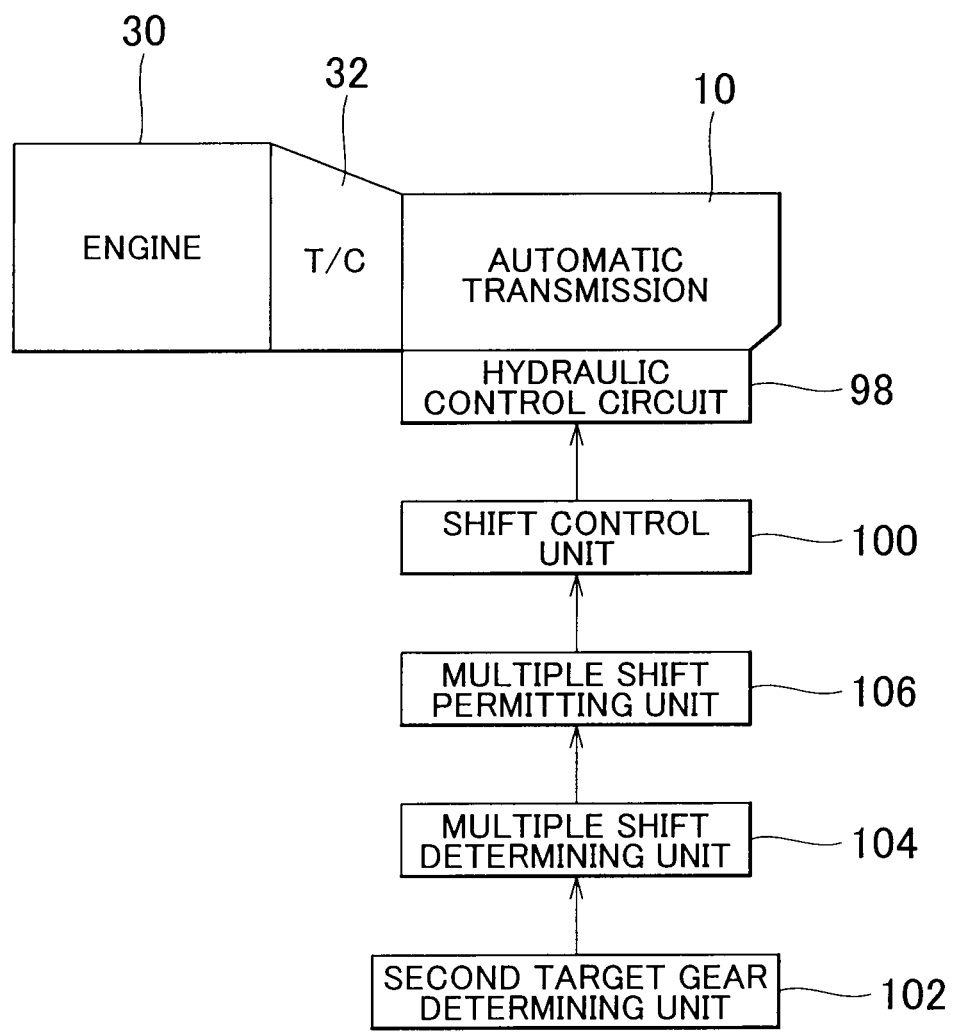
FIG. 8 is a functional block diagram explaining a principal part of control functions performed by an electronic control device according to one embodiment of the invention.

FIG. 8 is a functional block diagram useful for explaining a principal part of control functions performed by the electronic control device 90.

The shift control unit 100 determines whether the automatic transmission 10 should be shifted to another gear position, based on the actual vehicle speed V and accelerator pedal stroke Acc, referring to a pre-stored map, shift diagram or shift conditions as shown in FIG. 6 using the vehicle speed V and the accelerator pedal stroke Acc as variables. For example, the shift control unit 100 determines a gear position to which the automatic transmission 10 should be shifted during running of the vehicle at a given speed ratio (i.e., with the transmission 10 being in a given gear position), and executes automatic shift control of the automatic transmission 10 so as to establish the gear position thus determined. Upon execution of the automatic shift control, the shift control unit 100 generates a command(s) (i.e., shift output(s) or oil pressure command(s)) for engaging and/or releasing one or more hydraulic friction devices used in the shifting of the automatic transmission 10, to the hydraulic control circuit 98, so as to achieve the gear position or speed ratio according to the operation table as shown in FIG. 2, for example.

The hydraulic control circuit 98 operates one or more of the linear solenoid valves SL1-SL6 in the hydraulic control circuit 98 according to the command(s), so as to operate a corresponding one or ones of the hydraulic actuators 34, 36, 38, 40, 42, 44 of the hydraulic friction devices involved in the shifting, so that the automatic transmission 10 is shifted to the gear position thus determined.

The automatic transmission 10 of this embodiment is a multiple-speed automatic transmission that can be shifted among eight speeds or eight gear positions, and the spacing or interval between adjacent ones of the shift lines (i.e., upshift lines and downshift lines) is set to be narrow; therefore, the automatic transmission 10 is more likely to be shifted to another gear position in response to changes in the running conditions, as compared with multiple-speed automatic transmissions having seven or fewer gear positions. Also, a target gear position to which the automatic transmission 10 is to be shifted may be further changed during shift control for shifting to a given gear position.

For example, when the accelerator pedal 50 is depressed by the driver during running of the vehicle in running conditions of point "a" in FIG. 6 (where the automatic transmission 10 is in the eighth gear position), and the vehicle running conditions of point "a" are changed into those of point "b" due to the depression of the accelerator pedal 50, the automatic transmission 10 is shifted from the eighth gear position to the sixth gear position (namely, a two-speed or two-step gearshift is carried out). Generally, when the running conditions are changed from those of point "a" to those of point "b", a gearshift from the eighth gear position to the seventh gear position is started when the operating point in FIG. 6 passes a downshift line for downshift to the seventh gear position during transition from the conditions of point "a" to the conditions of point "b". Then, as the accelerator pedal travel Acc further increases during shifting from the eighth gear position to the seventh gear position, it is determined that the automatic transmission 10 should be shifted further down to the sixth gear position, and a gearshift to the sixth gear position is started. Here, the first target gear position as mentioned above in the summary of the invention corresponds to the sixth gear position in the following explanation, and the above-mentioned second target gear position corresponds to the fifth gear position in the following explanation, while the third target gear position corresponds to the seventh gear position in the following explanation. It is, however, to be understood that the above-indicated relationship or correspondence between the gear positions of the invention and those of the embodiment is a mere example, and that the corresponding gear positions according to the invention are not limited to those as described above.

In the above situation, multiple shift control for shifting from the eighth gear position to the sixth gear position is executed so as to quickly shift the automatic transmission 10 from the eighth gear position to the sixth gear position. For example, when a gearshift from the eighth gear position to the seventh gear position proceeds to a certain extent, or reaches a certain shift stage in the process of shifting, the shift control unit 100 starts shifting to the sixth gear position before the gearshift to the seventh gear position is completed. Namely, the shift control unit 100 provides a certain period of time or duration for which the gearshift from the eighth gear position to the seventh gear position and the gearshift from the seventh gear position to the sixth gear position overlap each other, so that the automatic transmission 10 is quickly shifted down to the sixth gear position.

If it is determined, based on the amount of depression of the accelerator pedal 50, the rate of change of the depression amount, the vehicle speed V, the shift stage, or the like, that the automatic transmission 10 should be shifted to the sixth gear position, before shifting from the eighth gear position to the seventh gear position is started, it may be determined that the automatic transmission 10 should be shifted from the eighth gear position directly to the sixth gear position, without being shifted to the seventh gear position. In this case, the shift control unit 100 carries out a direct gearshift (or single gearshift) from the eighth gear position to the sixth gear position, namely, performs clutch-to-clutch control for releasing the brake B1 and engaging the clutch C4 at the same time.

Figure 9:
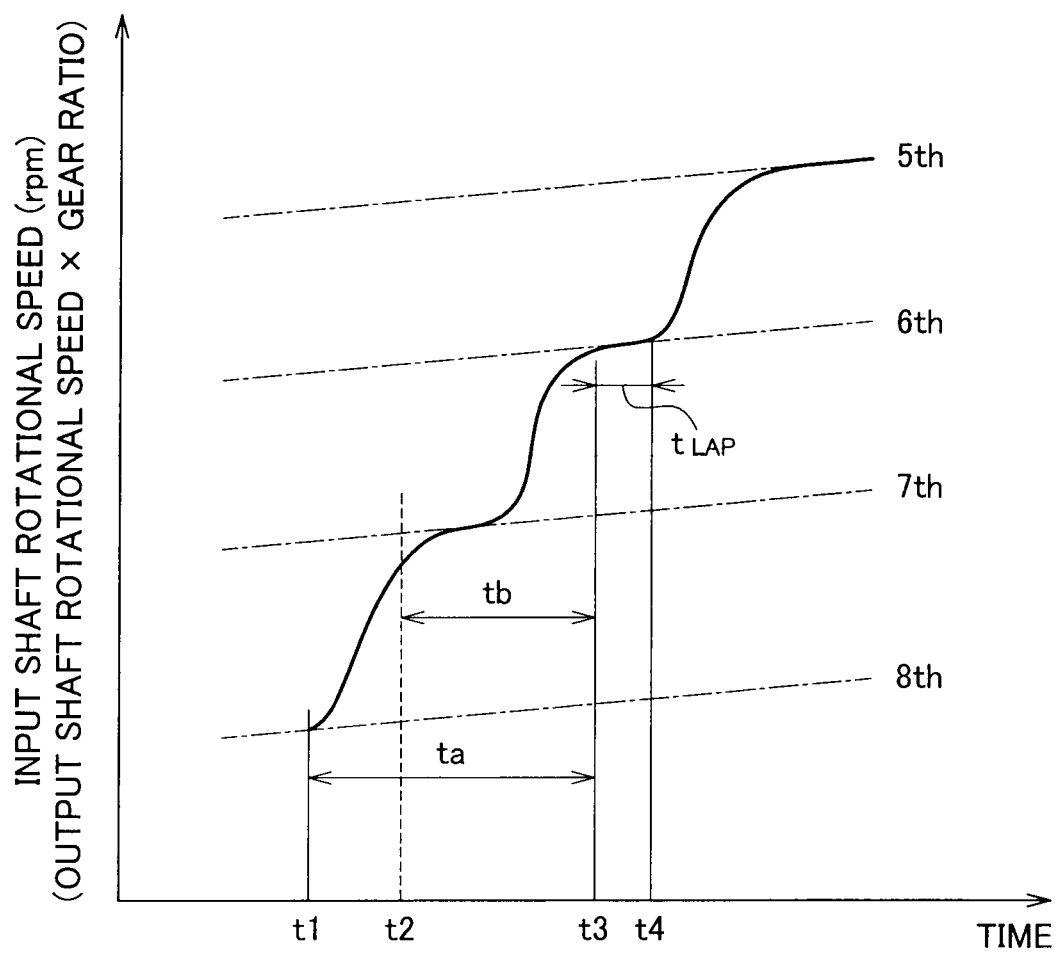
FIG. 9 is a view showing changes in the input shaft rotational speed during shifting of the automatic transmission according to the embodiment of the invention, with respect to time.

As described above, shifting from the eighth gear position to the sixth gear position may be controlled in different manners or modes, and a shift time, i.e., a length of time it takes to accomplish shifting to the sixth gear position, may be different from one control mode to another. FIG. 9 shows changes in the input shaft rotational speed $N_{IN}$ (=the output shaft rotational speed $N_{OUT}$ of the automatic transmission 10×the gear ratio) of the automatic transmission 10 due to shifting of the automatic transmission 10, with respect to time. If a gearshift from the eighth gear position to the seventh gear position is started at a point t1 in time, due to an increase of the accelerator pedal stroke Acc, for example, the input shaft rotational speed $N_{IN}$ increases as the gearshift proceeds. If it is determined that the automatic transmission 10 should be further shifted to the sixth gear position, during shifting to the seventh gear position in a period between time t1 and time t2, a gearshift to the sixth gear position is permitted after it is determined at time t2 that the gearshift to the seventh gear position has proceeded to a certain extent (i.e., has reached a certain shift stage). Then, shift control for shifting to the sixth gear position is carried out in a period between time t2 and time t4.

In the above situation, if the accelerator pedal 50 is further depressed, and the operating point in FIG. 6 passes a 6→5 downshift line while the running conditions are changed into those of point "c" (see FIG. 6) during a period between time t2 and time t3, so that it is determined at time t3 that the automatic transmission 10 should be shifted to the fifth gear position, a multiple gearshift to the fifth gear position is started when it is determined that the gearshift to the sixth gear position has proceeded to a certain extent or has reached a certain shift stage. To determine whether the gearshift to the fifth gear position is to be started, it is determined whether an engaging pressure as a command pressure of the clutch C4 as an engaging device to be engaged when the sixth gear position is established has reached a preset, given oil pressure (which will be referred to as "LAP output permission pressure $P_{LAP}$"). Accordingly, when the engaging pressure of the clutch C4 becomes equal to the LAP output permission pressure $P_{LAP}$ at time t4, a multiple gearshift to the fifth gear position is started. A shift permission time $t_{LAP}$ between time t3 and time t4 as indicated in FIG. 9 corresponds to a period of time it takes for the engaging pressure as the command pressure of the clutch C4 to reach the LAP output permission pressure $P_{LAP}$ after it is determined that the automatic transmission 10 should be shifted to the fifth gear position.

Figure 10:
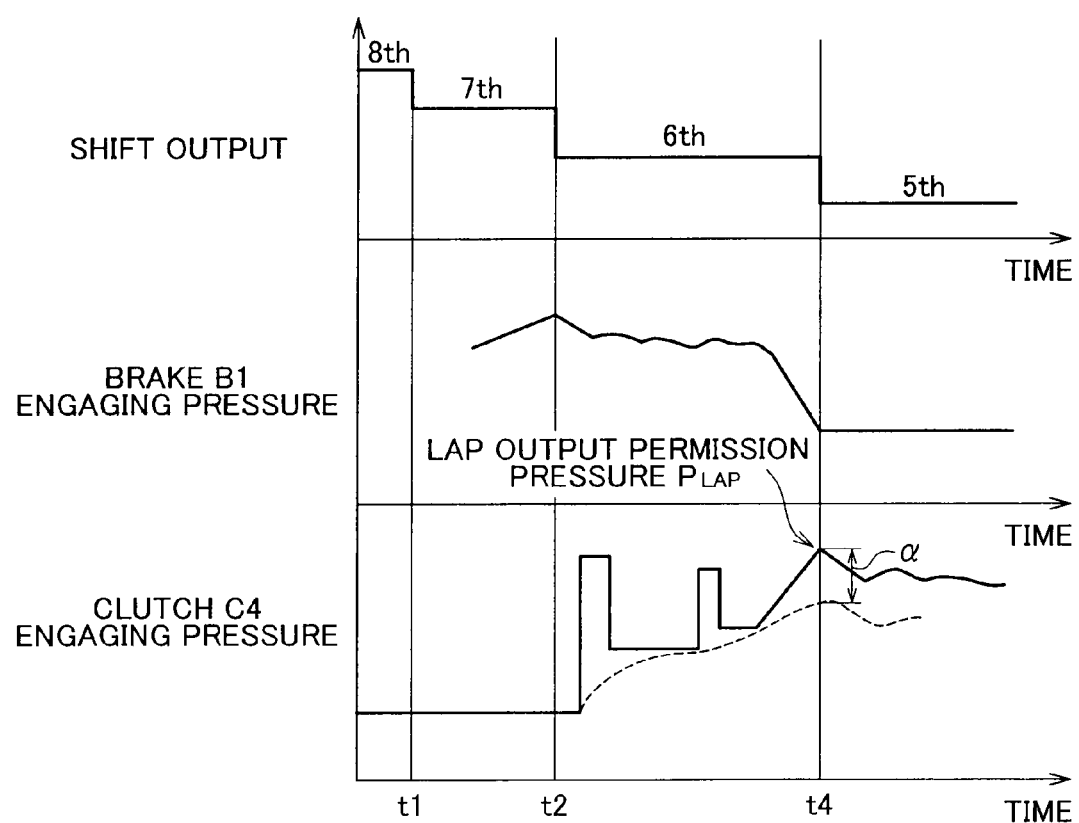
FIG. 10 is a time chart useful for explaining changes in an engaging pressure as a command pressure of an engaging device during shifting of the automatic transmission according to the embodiment of the invention.

In the gearshift to the fifth gear position which is started during shifting from the eighth gear position to the sixth gear position, if the automatic transmission 10 is directly shifted from the eighth gear position to the sixth gear position, the transmission 10 is not shifted to the seventh gear position, and therefore, a period of time it takes for the engaging pressure of the clutch C4 to reach a preset pressure is equal to a period of time to between time t1 and time t3 in FIG. 9. On the other hand, if it is determined during shifting from the eighth gear position to the seventh gear position that the automatic transmission 10 should be shifted further down to the sixth gear position, a period of time it takes for the engaging pressure of the clutch C4 to reach a preset pressure is reduced to a period of time tb between time t2 and time t3, due to the influence of the gearshift to the seventh gear position. With the amount of time for engagement of the clutch C4 thus reduced, if the start of the multiple gearshift to the fifth gear position is determined based on the command pressure as described above, there may arise a large difference or deviation α between the engaging pressure as the command pressure of the clutch C4 and the actual engaging pressure of the clutch C4, as shown in FIG. 10, when multiple gearshift is started. If the gearshift to the fifth gear position is started in the presence of such a large difference or deviation α, feedback-control for releasing the clutch C4, which becomes a release-side engaging device to be released so as to establish the fifth gear position, may not be normally carried out due to the difference α, and shift shock may occur.

The above-described shift control and operation will be further explained with reference to FIG. 10. FIG. 10 is a time chart useful for explaining changes in the engaging pressures as command pressures of the brake B1 and the clutch C4 during shifting of the automatic transmission 10. The time chart of FIG. 10 illustrates the case where a shift determination that the automatic transmission 10 should be shifted to the fifth gear position is made during shift control for shifting from the eighth gear position to the sixth gear position, in particular, the case where a shift determination that the automatic transmission 10 should be shifted to the sixth gear position is made during shifting from the eighth gear position to the seventh gear position.

If a shift output or command for a gearshift to the seventh gear position is generated at time t1, release control for releasing the brake B1 that is engaged in the eighth gear position is carried out. More specifically, a release oil pressure of the brake B1 is controlled in a feedback fashion based on, for example, the turbine speed $N_T$ and the amount of racing of the turbine. If a shift output or command for a gearshift to the sixth gear position is generated at time t2, the gearshift to the sixth gear position is started. Since the clutch C4 is an apply-side engaging device to be engaged to establish the sixth gear position, control for engaging the clutch C4 is started. At this time, in order to avoid operation of a fail-safe valve (not shown) provided for preventing interlocking of the automatic transmission 10 when the engaging devices of the automatic transmission 10 are engaged to a greater extent than necessary, control of the engaging pressure as the command pressure of the clutch C4 is inhibited from starting for a given period of time immediately after time t2, and the control of the engaging pressure of the clutch C4 is started with a certain time delay, namely, after the expiration of the given period of time. In a period between time t2 and time t4, control, such as fast fill for rapidly raising the command pressure of the clutch C4 so as to enhance the response of the actual engaging pressure indicated by the broken line in FIG. 10, is carried out, so that the actual engaging pressure of the clutch C4 is raised. Also, the engaging pressure (i.e., release pressure) of the brake B1 is controlled, through feedback control based on the turbine speed $N_T$, for example. If the engaging pressure as the command pressure of the clutch C4 reaches the preset LAP output permission pressure $P_{LAP}$ at time t4, a multiple gearshift to the fifth gear position is started. The LAP output permission pressure $P_{LAP}$ is determined in advance by experiment, or the like, and is set to a pressure level at or around which the automatic transmission 10 is placed in a position substantially equal to the sixth gear position (namely, a pressure level at or around which the clutch C4 has a torque capacity that causes no or substantially no slipping of the clutch C4), for example. Namely, the LAP output permission pressure $P_{LAP}$ is set to a pressure level that permits favorable implementation of a multiple gearshift to the fifth gear position. The LAP output permission pressure $P_{LAP}$ may be changed with learning control, or the like.

In the above situation, however, a large difference or deviation α as shown in FIG. 10 arises between the LAP output permission pressure $P_{LAP}$ as the command pressure and the actual oil pressure indicated by the broken line at time t4, as described above; therefore, subsequent control is performed in the presence of the large difference α, and shift shock may occur during shifting to the fifth gear position. In this embodiment, if a further downshift to the fifth gear position is determined during a multiple gearshift to the sixth gear position which is started during shifting from the eighth gear position to the seventh gear position, a multiple gearshift to the fifth gear position is inhibited from being started based on the LAP output permission pressure $P_{LAP}$, whereas a multiple gearshift to the fifth gear position is started based on the LAP output permission pressure $P_{LAP}$ only when the automatic transmission 10 is shifted from the eighth gear position directly to the sixth gear position (namely, only when a single gearshift from the eighth gear position to the sixth gear position takes place).

Referring back to FIG. 8, a second target gear determining unit 102 determines whether the automatic transmission 10 should be further shifted down to the fifth gear position that is even lower than the sixth gear position, during shifting from the eighth gear position to the sixth gear position. This determination is made at appropriate times based on the shift diagram shown in FIG. 6. When the second target gear determining unit 102 determines that the automatic transmission 10 should be shifted to the fifth gear position, a multiple shift determining unit 104 determines whether the gearshift to the sixth gear position is a gearshift (i.e., multiple gearshift) started during shifting from the eighth gear position to the seventh gear position adjacent to the eighth gear position, or the gearshift to the sixth gear position is a direct gearshift (i.e., single gearshift or skipping gearshift) from the eighth gear position to the sixth gear position.

Then, if the multiple shift determining unit 104 determines that the gearshift to the sixth gear position was executed or started during shifting from the eighth gear position to the seventh gear position, namely, determines that a shift determination that the automatic transmission 10 should be shifted to the fifth gear position was made during the gearshift to the sixth gear position which was started during shifting from the eighth gear position to the seventh gear position, a multiple shift permitting unit 106 inhibits the automatic transmission 10 from being shifted further down to the fifth gear position based on the LAP output permission pressure $P_{LAP}$. In this case, the automatic transmission 10 starts being shifted to the fifth gear position after completion of the gearshift to the sixth gear position. Also, when the multiple shift determining unit 104 determines that the gearshift to the sixth gear position is a direct gearshift (i.e., a single gearshift or skipping gearshift) from the eighth gear position to the sixth gear position, the multiple shift permitting unit 106 permits the automatic transmission 10 to be shifted further down to the fifth gear position based on the LAP output permission pressure $P_{LAP}$.

As discussed above, the engagement time ("ta" in FIG. 9) of the clutch C4 available in the single gearshift (or skipping gearshift) from the eighth gear position to the sixth gear position is longer than the engagement time ("tb" in FIG. 9) of the clutch C4 available when the gearshift to the sixth gear position is started during shifting from the eighth gear position to the seventh gear position; therefore, in the case of the single gearshift, the difference α between the command pressure of the clutch C4 and the actual engaging pressure at time t4 in FIG. 10 is reduced. Accordingly, even if a multiple gearshift to the fifth gear position is executed based on the LAP output permission pressure $P_{LAP}$, the feedback control of the clutch C4 is appropriately exercised upon and after time t4, so that shift shock is suppressed or reduced, and the shift time can be reduced.

Figure 11:
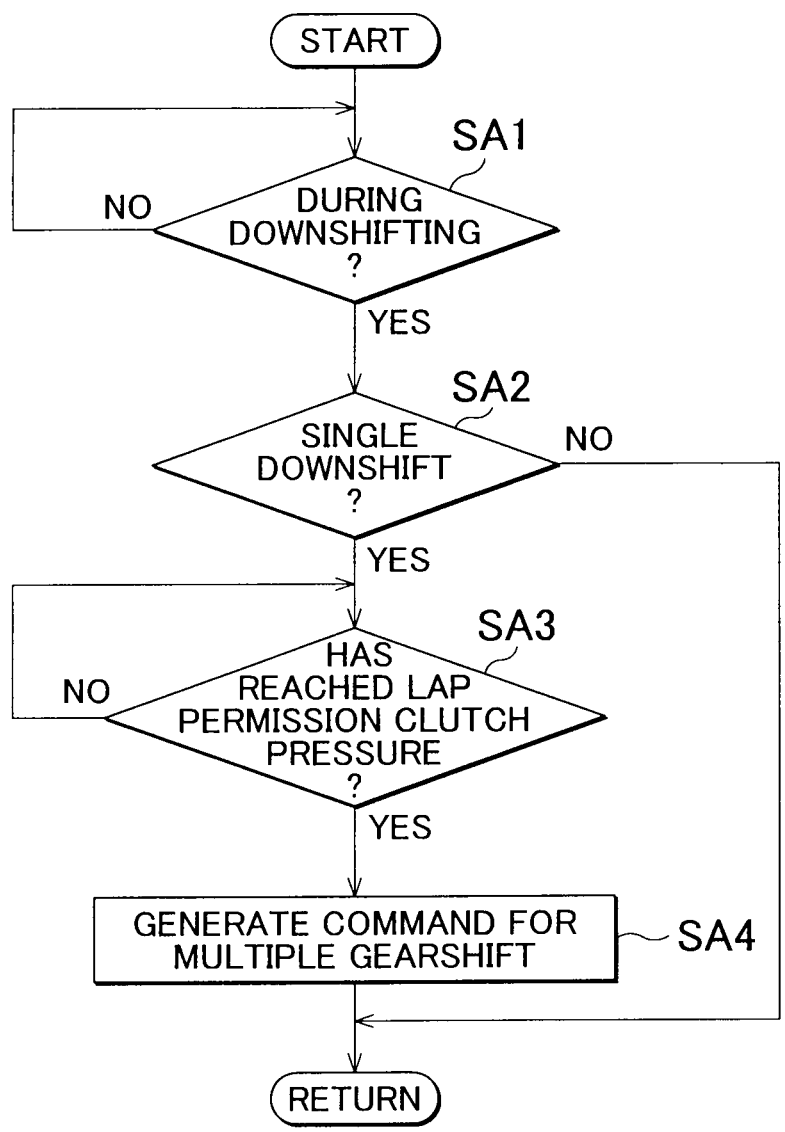
FIG. 11 is a flowchart illustrating a principal part of control operation of the electronic control device according to the embodiment of the invention, more specifically, a control operation that can achieve both reduction of shift shock and reduction of shift time when it is determined, during shifting to a certain gear position, that the automatic transmission should be further shifted to another gear position.

FIG. 11 is a flowchart illustrating a principal part of control operation of the electronic control device 90, and a control routine shown in FIG. 11 is repeatedly executed at an extremely short cycle time of several milliseconds to several tens of milliseconds. The flowchart of FIG. 11 illustrates, as one example, the case where it is determined, during shifting from the eighth gear position to the sixth gear position, that the automatic transmission 10 should be shifted to the fifth gear position.

Initially, in step SA1 corresponding to the second target gear determining unit 102 and the shift control unit 100, it is determined whether a shift determination that the automatic transmission 10 should be shifted to the fifth gear position is made during shifting from the eighth gear position to the sixth gear position. If a negative decision (NO) is obtained in step SA1, the control returns to step SA1 to repeatedly make the same determination. If it is determined that the automatic transmission 10 should be shifted to the fifth gear position, and an affirmative decision (YES) is obtained in step SA1, step SA2 corresponding to the multiple shift determining unit 104 is executed to determine whether the gearshift from the eighth gear position to the sixth gear position is a single downshift (or single gearshift) that does not involve a gearshift from the eighth gear position to the seventh gear position. If a negative decision (NO) is obtained in step SA2, for example, if the gearshift to the sixth gear position is a multiple gearshift executed during shifting from the eighth gear position to the seventh gear position, it is determined, when a further multiple gearshift to the fifth gear position is executed, that a large difference or deviation α appears between the command pressure of the clutch C4 and the actual oil pressure. On the basis of this determination, a signal for executing the multiple gearshift to the fifth gear position is inhibited from being generated, and the gearshift to the fifth gear position is started after the gearshift to the sixth gear position is completed.

If an affirmative decision (YES) is obtained in step SA2, on the other hand, step SA3 corresponding to the multiple shift permitting unit 106 is executed to determine whether a multiple gearshift to the fifth gear position is permitted based on the LAP output permission pressure $P_{LAP}$. More specifically, it is determined whether the engaging pressure as the command pressure of the clutch C4 has reached the preset LAP output permission pressure $P_{LAP}$. If a negative decision (NO) is obtained in step SA3, the determination of step SA3 is made again. Namely, the same determination is repeatedly made until the command pressure of the clutch C4 becomes equal to the LAP output permission pressure $P_{LAP}$. If an affirmative decision (YES) is obtained in step SA3, namely, if the command pressure of the clutch C4 reaches the LAP output permission pressure $P_{LAP}$, step SA4 corresponding to the shift control unit 100 is executed to start control of the multiple gearshift to the fifth gear position. Thus, the control of the multiple gearshift to the fifth gear position is permitted only in the case of the direct gearshift (or single gearshift) from the eighth gear position to the sixth gear position, and the multiple gearshift to the fifth gear position is started. As a result, the automatic transmission 10 is quickly shifted to the fifth gear position, while shift shock is reduced. In the case where the gearshift to the sixth gear position was executed or started during shifting from the eighth gear position to the seventh gear position, even if it is determined that the automatic transmission 10 should be shifted to the fifth gear position, the gearshift to the fifth gear position is started after the gearshift to the sixth gear position is completed. Accordingly, shift shock is surely reduced or prevented.

Although the case where it is determined that the automatic transmission 10 should be shifted to the fifth gear position during shifting from the eighth gear position to the sixth gear position has been illustrated as one example, the invention is also applicable to, for example, the case where it is determined that the automatic transmission 10 should be shifted to the second gear position during shifting from the fifth gear position to the third gear position. Namely, when it is determined that the automatic transmission should be further shifted to another gear position during shifting under a condition where the influence of the previous gearshift still remains, a relatively large difference or deviation is likely to appear between the command pressure and the actual oil pressure. In this case, the multiple shift permitting unit 106 uniformly inhibits multiple shifting so as to reduce shift shock. The above description can be suitably applied to any combination of gear positions of the automatic transmission 10. More specifically, when it is determined that the automatic transmission 10 should be shifted to the second gear position during shifting from the fifth gear position to the third gear position, for example, it is determined whether a multiple gearshift to the second gear position is permitted, depending on whether a gearshift to the third gear position is a multiple gearshift that is started during shifting from the fifth gear position to the fourth gear position, or a gearshift to the third gear position is a single gearshift from the fifth gear position to the third gear position, so as to accomplish both reduction of shift shock and reduction of the shift time.

According to the embodiment as described above, a multiple gearshift to a second target gear position (e.g., fifth gear position) is permitted only when it is determined that the automatic transmission 10 should be shifted to the second target gear position (e.g., fifth gear position) during a single gearshift to a first target gear position (e.g., sixth gear position). It is thus possible to quickly carry out the multiple gearshift to the second target gear position (e.g., fifth gear position) while reducing or preventing shift shock. When the gearshift to the first target gear position (e.g., sixth gear position) was a single gearshift, the gearshift is not affected by any previous gearshift; therefore, even where multiple shift control for shifting to the second target gear position (e.g., fifth gear position) is immediately executed based on a certain condition, the multiple shift control is started in a condition where an engaging pressure as a command pressure of an engaging device (e.g., clutch C4) to be controlled under the multiple shift control for shifting to the second target gear position (e.g., fifth gear position) is substantially equal to the actual engaging pressure. Thus, in the multiple shift control for shifting to the second target gear position (e.g., fifth gear position), the actual engaging pressure of the engaging device (e.g., clutch C4) is controlled with high accuracy, and therefore, shift shock is favorably suppressed or prevented.

On the other hand, when it is determined that the automatic transmission 10 should be further shifted to the second target gear position (e.g., fifth gear position) during a multiple gearshift to the first target gear position (e.g., sixth gear position) which is started during shifting to another gear position (e.g., seventh gear position) as a third gear position that is different from the first target gear position and the second target gear position, a multiple gearshift to the second target gear position (e.g., fifth gear position) is inhibited, so that shift shock is effectively reduced or suppressed. In the situation as described above, if a multiple gearshift to the second target gear position (e.g., fifth gear position) is immediately executed under a certain condition, the multiple shift control is started in a condition where a large difference or deviation α appears between the engaging pressure as the command pressure of the engaging device (e.g., clutch C4) and the actual engaging pressure, due to an influence of the previous gearshift, which may result in occurrence of shift shock. In this case, the multiple gearshift to the second target gear position (e.g., fifth gear position) is inhibited, so that shift shock can be effectively reduced.

According to this embodiment, the multiple shift permitting unit 106 permits a multiple gearshift to the second target gear position (e.g., fifth gear position) when the command pressure of the engaging device (e.g., clutch C4) to be engaged to establish the first target gear position (e.g., sixth gear position) reaches a preset, given pressure level (LAP output permission pressure $P_{LAP}$). Therefore, the multiple gearshift to the second target gear position (e.g., fifth gear position) is started immediately after the engaging pressure of the engaging device (e.g., clutch C4) becomes equal to the given pressure level (LAP output permission pressure $P_{LAP}$) appropriate to start of a gearshift to the second target gear position (e.g., fifth gear position). Accordingly, shift shock is effectively reduced upon the multiple gearshift to the second target gear position (e.g., fifth gear position), and the shift time is shortened.

According to this embodiment, when a multiple gearshift to the second target gear position (e.g., fifth gear position) is inhibited by the multiple shift permitting unit 106, a gearshift to the second target gear position (e.g., fifth gear position) is carried out after a gearshift to the first target gear position (e.g., sixth gear position) is completed. Therefore, shift shock can be surely suppressed during shifting to the second target gear position (e.g., fifth gear position).

According to this embodiment, the engaging device (e.g., clutch C4) is engaged upon a gearshift to the first target gear position (e.g., sixth gear position), and is released upon a gearshift to the second target gear position (e.g., fifth gear position). Therefore, where the gearshift to the first target gear position (e.g., sixth gear position) is a multiple gearshift that is started during shifting to another gear position (e.g., seventh gear position), the shift time available for shifting to the first target gear position (e.g., sixth gear position) is reduced due to an influence of the gearshift to the above-indicated another gear position (e.g., seventh gear position), and a large difference or deviation α may arise between the command pressure of the engaging device (e.g., clutch C4) and the actual engaging pressure. In this case, a multiple gearshift to the second target gear position (e.g., fifth gear position) is inhibited, so that shift shock can be reduced which would otherwise occur due to a multiple gearshift to the second target gear position (e.g., fifth gear position) in the presence of the large difference α.

In this embodiment in which a gearshift from the current gear position to the first target gear position is downshift; therefore, shift shock is effectively reduced during downshifting, and the shift time is shortened. In this embodiment, a further gearshift to the second target gear position is also downshift; therefore, shift shock is effectively reduced during downshifting, and the shift time is shortened.

While one embodiment of the invention has been described in detail with reference to the drawings, the invention may be embodied in other forms.

For example, the number of the gear positions of the automatic transmission 10 and the relationship between the gear positions and the operating (engaged or release) states of the friction devices are not particularly limited to those of the illustrated embodiment. The invention may be applied to any type of automatic transmission having a plurality of gear positions, in which each gear position is established according to an operation table indicating engagement of the friction devices.

While a two-step or two-speed gearshift from the eighth gear position to the sixth gear position has been explained as one example in the illustrated embodiment, the invention may be applied to three-step or larger gearshifts.

While the case where it is determined that the automatic transmission should be shifted to the fifth gear position during shifting from the eighth gear position to the sixth gear position has been explained as one example in the illustrated embodiment, the invention may be applied to gearshifts among other gear positions of the automatic transmission 10. For example, the invention is applicable to the case where it is determined that the automatic transmission should be shifted to the second gear position during shifting from the fifth gear position to the third gear position. As another example, the invention is applicable to the case where it is determined that the automatic transmission should be shifted to the eighth gear position during an upshift from the fifth gear position to the seventh gear position. Namely, the gearshifts to which the invention is applicable may be upshifts. Where the sixth gear position is taken as an example, the automatic transmission may be shifted to the sixth gear position in various shift patterns from a wide variety of shift conditions, and it is difficult to switch the method of shifting as appropriate according to each of the shift patterns. Accordingly, when it is determined that the automatic transmission should be further shifted to another gear position, such as the fifth gear position, during shifting to the sixth gear position in a condition where an influence of a gearshift to another gear position still remains, shift shock is more likely to occur since a large difference between the command pressure and the actual oil pressure arises from the influence. In this case, therefore, a multiple gearshift to the fifth gear position is uniformly inhibited, and the multiple gearshift is permitted only when the gearshift to the sixth gear position was a single gearshift, so that shift shock is favorably suppressed. It is to be understood that the sixth gear position is a mere example, and that the invention is similarly applied to other gear positions.

It is also to be understood that the above-described embodiment and modified examples are presented for illustrative purpose only, and that the invention can be embodied with various other changes, modifications or improvements, based on the knowledge of those skilled in the art.

What is claimed is:

1. A control device of an automatic transmission of a vehicle, comprising:
   a shift control unit that determines a gear position to which the automatic transmission is to be shifted from a current gear position, based on predetermined shift conditions, and executes shift control so as to establish the determined gear position;
   a second target gear determining unit that determines, during shifting from the current gear position to a first target gear position, whether the shift control unit determines that the automatic transmission is to be shifted further than the first target gear position to a second target gear position, which is remote from the current gear position;
   a multiple shift determining unit that determines whether a gearshift to the first target gear position is carried out during shifting to a third target gear position that is different from the first target gear position and the second target gear position; and
   a multiple shift permitting unit that inhibits a multiple gearshift to the second target gear position when the shift control unit determines, during a multiple gearshift to the first target gear position which is started during a gearshift from the current gear position to the third target gear position, that the automatic transmission is to be shifted to the second target gear position, and permits the multiple gearshift to the second target gear position when the shift control unit determines, during a single gearshift from the current gear position to the first target gear position, that the automatic transmission is to be shifted to the second target gear position, wherein the multiple shift permitting unit permits the multiple gearshift to the second target gear position when a command oil pressure of an engaging device that is engageable to establish the first target gear position reaches a predetermined pressure level.

2. The control device according to claim 1, wherein
when the multiple shift permitting unit permits the multiple gearshift to the second target gear position, the shift control unit starts multiple shift control for the multiple gearshift to the second target gear position when the command oil pressure of the engaging device that is engageable to establish the first target gear position reaches the predetermined pressure level.

3. The control device according to claim 1, wherein
when the multiple shift permitting unit inhibits the multiple gearshift to the second target gear position, the shift control unit starts shift control for a gearshift to the second target gear position after the gearshift to the first target gear position is completed.

4. The control device according to claim 2, wherein
the engaging device is engaged when the automatic transmission is shifted to the first target gear position, and is released when the automatic transmission is shifted to the second target gear position.

5. The control device according to claim 1, wherein the automatic transmission is shifted down to the first target gear position.

6. The control device according to claim 1, wherein the automatic transmission is shifted down to the second target gear position.

7. The control device according to claim 1, wherein the automatic transmission is shifted up to the first target gear position.

8. The control device according to claim 1, wherein the gearshift to the first target gear position is carried out during running of the vehicle.

9. The control device according to claim 1, wherein the third target gear position is a gear position that is higher or lower by one gear step than a gear position established before the gearshift to the third target gear position.

10. The control device according to claim 1, wherein
when the multiple shift determining unit determines, during shifting to the third target gear position, that the shift control unit determines that the automatic transmission is to be shifted to the first target gear position, control of an engaging oil pressure of the engaging device that is engageable to establish the first target gear position is inhibited from starting for a predetermined period of time.

11. A method of controlling an automatic transmission of a vehicle, comprising:
determining a gear position to which the automatic transmission is to be shifted from a current gear position, based on predetermined shift conditions, and executing shift control so as to establish the determined gear position;
determining, during shifting from the current gear position to a first target gear position, whether it is determined that the automatic transmission is to be shifted further than the first target gear position to a second target gear position, which is remote from the current gear position;
determining whether a gearshift to the first target gear position is carried out during shifting to a third target gear position that is different from the first target gear position and the second target gear position;
inhibiting a multiple gearshift to the second target gear position when it is determined, during a multiple gearshift to the first target gear position which is started during a gearshift from the current gear position to the third target gear position, that the automatic transmission is to be shifted to the second target gear position; and
permitting the multiple gearshift to the second target gear position when it is determined, during a single gearshift from the current gear position to the first target gear position, that the automatic transmission is to be shifted to the second target gear position,
wherein the multiple gearshift to the second target gear position is permitted when a command oil pressure of an engaging device that is engageable to establish the first target gear position reaches a predetermined pressure level.

12. The method according to claim 11, wherein
when the multiple gearshift to the second target gear position is permitted, multiple shift control for the multiple gearshift to the second target gear position is started when the command oil pressure of the engaging device that is engageable to establish the first target gear position reaches the predetermined pressure level.

13. The method according to claim 11, wherein
when the multiple gearshift to the second target gear position is inhibited, shift control for a gearshift to the second target gear position is started after the gearshift to the first target gear position is completed.

14. The method according to claim 12, wherein
the engaging device is engaged when the automatic transmission is shifted to the first target gear position, and is released when the automatic transmission is shifted to the second target gear position.

15. The method according to claim 11, wherein the automatic transmission is shifted down to the first target gear position.

16. The method according to claim 11, wherein the automatic transmission is shifted down to the second target gear position.

17. The method according to claim 11, wherein the automatic transmission is shifted up to the first target gear position.

18. The method according to claim 11, wherein the gearshift to the first target gear position is carried out during running of the vehicle.

19. The method according to claim 11, wherein the third target gear position is a gear position that is higher or lower by one gear step than a gear position established before the gearshift to the third target gear position.

20. The method according to claim 11, wherein
when it is determined, during shifting to the third target gear position, that the automatic transmission is to be shifted to the first target gear position, control of an engaging oil pressure of the engaging device that is engageable to establish the first target gear position is inhibited from starting for a predetermined period of time.

21. A control device of an automatic transmission of a vehicle, comprising:
  circuitry configured to:
    determine a gear position to which the automatic transmission is to be shifted from a current gear position, based on predetermined shift conditions, and execute shift control so as to establish the determined gear position;
    determine, during shifting from the current gear position to a first target gear position, whether the automatic transmission is to be shifted further than the first target gear position to a second target gear position, which is remote from the eutTeni gear position;
    determine whether a gearshift to the first target gear position is carried out during shifting to a third target gear position that is different from the first target gear position and the second target gear position; and
    inhibit a multiple gearshift to the second target gear position when the circuitry determines, during a multiple gearshift to the first target gear position which is started during a gearshift from the current gear position to the third target gear position, that the automatic transmission is to be shifted to the second target gear position, and permit the multiple gearshift to the second target gear position when the circuitry determines, during a single gearshift from the current gear position to the first target gear position, that the automatic transmission is to be shifted to the second target gear position.

* * * * *